March 29, 1938.  J. H. DORAN  2,112,738
ELASTIC FLUID TURBINE
Filed May 29, 1936
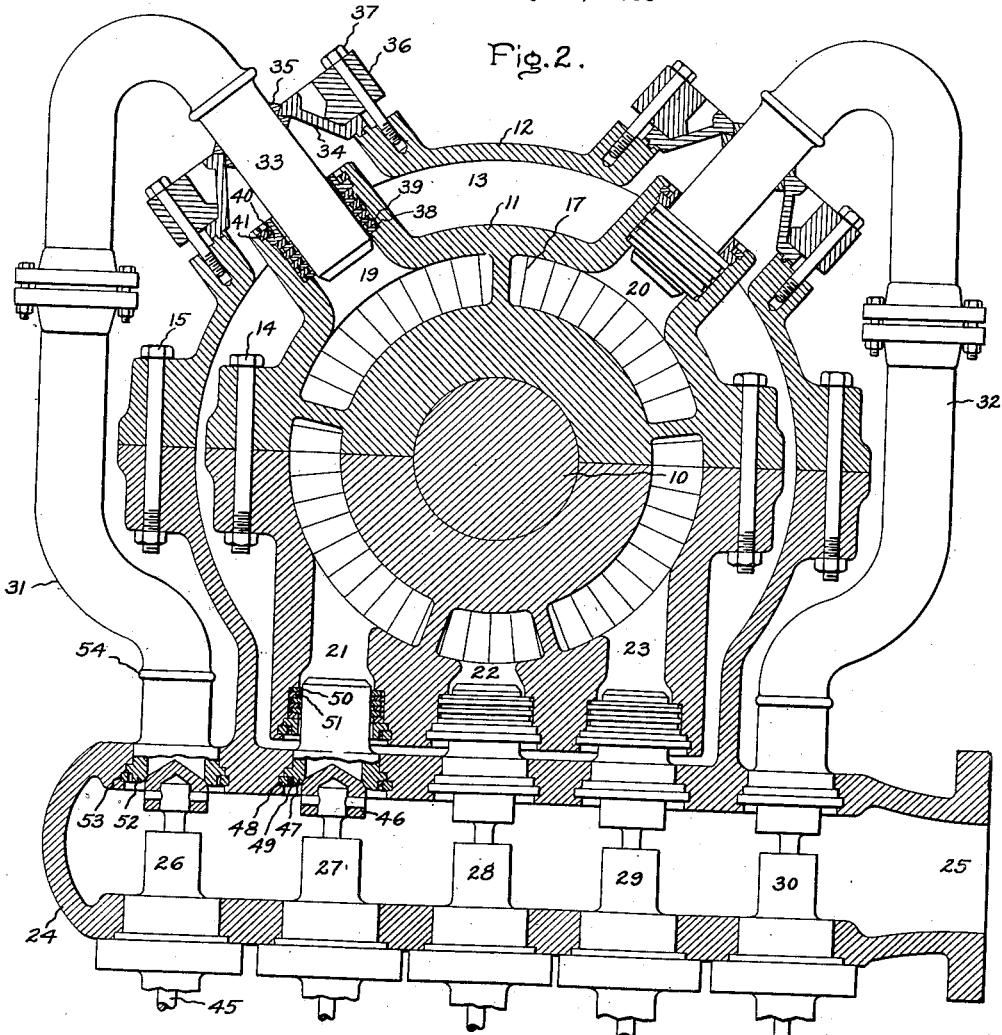
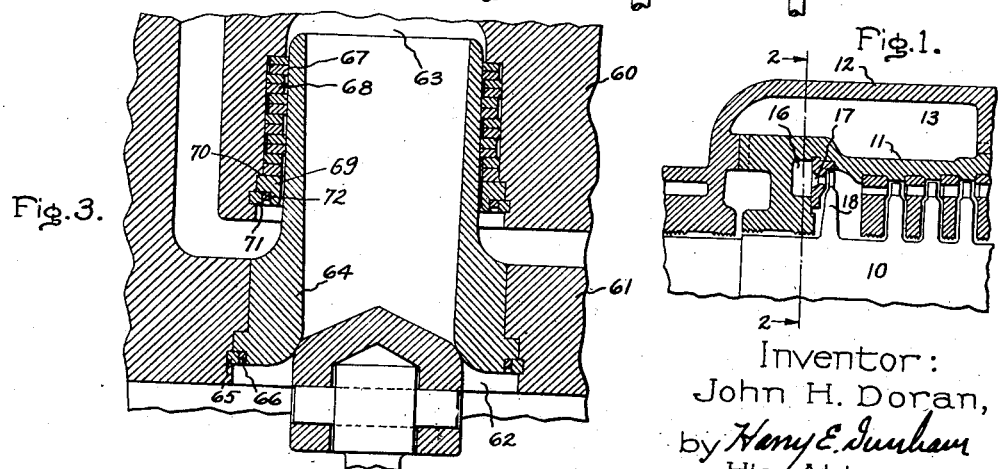
Inventor:
John H. Doran,
by Harry E. Dunham
His Attorney.

Patented Mar. 29, 1938

2,112,738

UNITED STATES PATENT OFFICE 2,112,738

ELASTIC FLUID TURBINE

John H. Doran, Scotia, N. Y., assignor to General Electric Company, a corporation of New York Application May 29, 1936, Serial No. 82,496

4 Claims. (Cl. 253—39)

The present invention relates to elastic fluid turbines, more specifically to the type of turbines which have a double casing for operation with elastic fluids of relatively high pressures, for example, pressures of the order of 1000 lbs. per square inch and relatively high temperatures, for example, temperatures of the order of 1200° F. The provision of a double casing, that is, an inner and outer casing, permits of a dimension of the pressure between the two casings whereby there is obtained a considerable reduction in the stresses set up by the high elastic fluid pressures on the respective casings. For instance, in case the inlet pressure of the elastic fluid is 1000 lbs. per square inch and a pressure of for instance 500 lbs. is maintained in the annular space defined between the two casings the pressure drop across each of the two casings is 500 lbs. only. The high temperatures to which the casings are subjected cause considerable expansion and contraction, particularly of the inner casing, and difficulties are encountered in properly connecting the inner casing to the source of high pressure, high temperature elastic fluid.

The object of my invention is to provide an improved construction and arrangement in a high pressure, high temperature elastic fluid turbine of the double casing type whereby the inlet or inlets of the inner casing may be readily connected to the source of elastic fluid.

For a consideration of what I believe to be novel and my invention, attention is directed to the following description and the claims appended thereto in connection with the accompanying drawing.

In the drawing, Fig. 1 represents a somewhat diagrammatic view of an elastic fluid turbine embodying my invention; Fig. 2 is an enlarged sectional detail view along line 2—2 of Fig. 1; and Fig. 3 is an enlarged detail view of a modification of my invention.

The elastic fluid turbine, shown in Figs. 1 and 2, has a solid rotor 10 disposed within an inner casing 11, which latter is surrounded by an outer casing 12. The annular space 13 defined between the inner and the outer casing communicates with an intermediate turbine stage whereby a pressure of the order of several hundred pounds is maintained therein. The inner and outer casings are divided along a horizontal plane through the axis of the turbine. The lower and upper portions of each casing are flanged and secured together by means of bolts 14 and 15 respectively. The inlet portion of the inner casing 11 defines an annular space 16 (Fig. 1) for receiving live elastic fluid. The elastic fluid is conducted from the space 16 through a nozzle diaphragm 17 to the first stage bucket wheel 18 of the turbine. In order to effect uniform flow of elastic fluid through the nozzle diaphragm 17, the elastic fluid is conducted to several circumferentially spaced-apart portions of the annular space 16. In the present instance the inner casing 11, Fig. 2, has two upper circumferentially spaced inlet openings 19, 20 and three lower circumferentially spaced inlet openings 21, 22 and 23. The aforementioned inlets 19 to 23 are cylindrical and of considerable length to accommodate elements associated therewith as described hereafter.

In accordance with my invention the outer casing is integrally united with an elastic fluid chest 24 preferably disposed below the outer casing. In the present instance the chest 24 forms an integral part of the lower portion of the outer casing 12. The chest has an inlet 25 for receiving elastic fluid and a plurality of outlets for discharging elastic fluid to the aforementioned inlet openings 19 to 23. Some of the outlets are in the common wall portion of the chest and the outer casing. The flow through the outlets is controlled by five valves 26, 27, 28, 29 and 30. The valves 26 and 30 serve to control the flow of elastic fluid to the inlets 19, 20 and the valves 27 to 29 serve to control the flow of elastic fluid to the turbine inlets 21 to 23. The chest 24 is connected to the upper inlets 19 and 20 by means of two conduits 31 and 32 respectively. Each of said conduits has a discharge or end portion 33 which in accordance with my invention is rigidly secured to an open portion of the outer casing and has a flexible connection with the inner casing. The rigid connection between the conduit portion 33 and the outer casing 12 comprises a ring 34 secured to the portion 33 by a weld 35 and sealed to the open portion of the outer casing by means including a clamp ring 36 and a plurality of bolts 37. Thus the connection between the outlet portions 33 and the outer casing is fluid-tight, permitting the maintenance of a substantial pressure within the space 13 intermediate the inner and the outer casing. The inner casing 11 is connected to the conduit portion 33 by means of a flexible coupling. Said coupling comprises in accordance with my invention a plurality of rings 38 having an inner packing surface engaging the outer surface of the conduit portion 33 and an outer surface spaced from the cylindrical surface defined by the inlet opening 19. These rings 38 alternate with a plurality of other rings 39 which have an inner surface spaced from the conduit 33 and an outer surface engaging the cylindrical surface of the inlet opening 19. The rings are held in position, that is, prevented from radial outward movement, by locking means including an end ring 40 held in position by means including a split ring 41. With this arrangement leakage along the conduit 33 from the interior of the inner casing 11 into the intermediate space 13 is reduced to a minimum and at the same time the inner casing 11 may expand radially as well as axially without materially affecting the sealing connection with the inlet conduit 31, 33.

Each of the valves 26 to 30 has a valve stem 45 which is moved by suitable cam-control means, not shown. A valve member 46 is secured to the inner end of each valve stem and arranged in cooperative relation to a valve seat. Each valve seat in accordance with my invention is formed by a cylindrical member 47 having one end rigidly secured to the wall of the valve chest by means including a split ring 48 and a locking ring 49 and another end projecting into the cylindrical openings 21, 22 and 23 respectively. This other end is connected to the open portions of the inner casing by means of flexible coupling means similar to the coupling or connecting means for connecting the conduits 31 to the openings 19, 20. More specifically, each coupling means comprises a plurality of rings 50 which have an inner surface in packing engagement with the outer surface of the cylindrical member 47, whereas the outer surfaces of the ring 50 are spaced from the cylindrical surfaces of the openings 21 to 23 respectively. The rings 50 alternate with a plurality of other or sealing rings 51 which have an outer surface which engages the cylindrical surfaces of openings 21 to 23, and an inner surface spaced from the outer cylindrical surface of the cylindrical element 47. The arrangement is similar with regard to valves 27, 28 and 29, whereas the seat for the valves 26 and 30 is defined by a cylindrical member 52 secured at its lower end to the wall of the valve chest and by means including a split ring 53. The upper end of the cylindrical element 52 is united with an end portion of the conduit 31 by a weld 54.

The arrangement shown in Fig. 3 comprises an inner casing 60 surrounded by an outer casing 61 corresponding to casings 11 and 12 of Fig. 1. The elastic fluid is conducted through an opening 62 in the outer casing to an opening 63 in the inner casing by means including a cylindrical element 64 corresponding to the element 47 of Fig. 2. The lower end of the cylindrical element 64 is secured to the wall of the outer casing 61 by means including a split ring 65 and locking ring 66. The outer cylindrical surface of the element 64 is sealed against the surrounding cylindrical surface of the opening 63 by a plurality of pairs of packing rings 67 alternating with a plurality of pairs of packing rings 68. The rings 67 have sealing engagement with the outer surface of the element 64 but have clearance with the cylindrical surface 63 of the casing 60, whereas the pairs of rings 68 are spaced from the outer surface of the cylindrical element 64 and are in sealing engagement with the cylindrical surface 63 of the casing 60. The pairs of rings 67, 68 are held in position by means including an end ring 69 which is locked to a shouldered portion 70 of the casing by means including a split ring 71 and a locking ring 72. During operation the rings permit relative movement between the casing 60 and the cylindrical member 64, that is, the casing 60 is free to move due to expansion in axial and radial direction without setting up any stresses in the cylindrical member 64 and without materially affecting the sealing between the cylindrical member 64 and the casing 60.

What I claim as new and desire to secure by Letters Patent of the United States is:

1. A high pressure high temperature elastic fluid turbine including the combination of an outer casing, an inner casing disposed within and spaced from the outer casing to define an intermediate space for receiving elastic fluid at an intermediate pressure, means for conducting elastic fluid to the inner casing comprising a valve chest having a wall portion with a plurality of openings defined by the wall of the outer casing, and means for conducting elastic fluid from the chest into the inner casing comprising cylindrical elements detachably secured to the openings in the chest and flexible sealing means between the cylindrical elements and the inner casing.

2. A high pressure high temperature elastic fluid turbine including the combination of an outer casing, an inner casing disposed within and spaced from the outer casing to define a space for receiving fluid at an intermediate pressure, a valve chest rigidly secured to the outer casing and having a wall portion defined by the outer casing, an opening in said wall portion, another opening in the inner casing, means for conducting elastic fluid from the chest through said openings into the inner casing comprising a cylindrical member forming a valve seat detachably secured to the open wall portion of the chest and projecting into the opening in the inner casing and flexible sealing means between said cylindrical member and the inner casing to reduce leakage from the inner casing into said intermediate space.

3. A high pressure high temperature elastic fluid turbine including the combination of an outer casing, an inner casing disposed within and spaced from the outer casing to define a space for receiving fluid at an intermediate pressure, a valve chest integrally formed with the outer casing and having a wall portion defined by the outer casing, an opening in said wall portion, another opening in the inner casing, means for conducting elastic fluid from the chest through said openings into the inner casing comprising a cylindrical member having an end portion forming a valve seat within the chest and being rigidly secured to the open wall portion of the chest, said member having another end portion projecting into the opening in the inner casing and being spaced from the wall of said opening, and flexible sealing means between the other end portion and the inner casing.

4. A high pressure high temperature elastic fluid turbine including the combination of an outer casing, an inner casing, a valve chest having a wall portion with a plurality of openings defined by the lower portion of the outer casing, means for conducting elastic fluid from the chest to the inner casing comprising a cylindrical member having a flanged end portion, means for detachably securing the flanged end portion to a seat formed by one of the openings, the cylindrical member having another end portion projecting into an opening in the inner casing, flexible sealing means between the other end portion and the adjacent wall portion of the inner casing, and valve means for controlling the flow of elastic fluid from the chest into the inner casing including a valve seat defined by the flanged end portion of the cylindrical member.

JOHN H. DORAN.